United States Patent [19]
Campfield, Jr.

[11] Patent Number: 5,116,441
[45] Date of Patent: May 26, 1992

[54] GLASS REPAIR KIT AND METHOD OF USE

[76] Inventor: Richard A. Campfield, Jr., 9249 Loquat Dr., Riverside, Calif. 92508

[21] Appl. No.: 580,075

[22] Filed: Sep. 10, 1990

[51] Int. Cl.⁵ ............................................... B32B 35/00
[52] U.S. Cl. ........................................ 156/94; 425/12; 425/13; 264/36
[58] Field of Search ..................... 156/94; 425/11, 12, 425/13; 264/36

[56] References Cited

U.S. PATENT DOCUMENTS

| | | | |
|---|---|---|---|
| 3,765,975 | 10/1973 | Hollingsworth | 264/102 X |
| 3,993,520 | 11/1976 | Werner et al. | 425/13 X |
| 4,744,841 | 5/1988 | Thomas | 425/13 X |
| 4,814,185 | 3/1989 | Jones | 425/13 X |
| 4,820,148 | 4/1989 | Anderson | 425/12 |
| 4,921,411 | 5/1990 | Ottenheimer | 425/13 X |

Primary Examiner—Michael W. Ball
Assistant Examiner—Mark A. Osele
Attorney, Agent, or Firm—Lawrence S. Cohen; Timothy T. Tyson

[57] ABSTRACT

A kit (150) of parts from which tools may be assembled for the repair of glass cracks by insertion of resin having an index of refraction substantially that of the glass. The tools are a repair bridge (160) and a repair bar (180) which may be placed on an automobile windshield and used to inject resin into a glass crack and a crack spreader (170) which may be placed on the inside of a windshield and used to spread the crack to facilitate entry of the resin. Methods of use of the tools are disclosed.

30 Claims, 6 Drawing Sheets

GLASS REPAIR KIT AND METHOD OF USE

TECHNICAL FIELD

The present invention pertains to glass crack repair, and more particularly, to repair, in place, of automobile windshield cracks.

BACKGROUND ART

Various resin products are commercially available in the trade for the repair of glass cracks and, in particular, the repair of automobile windshield cracks. Such repair may be done in place without removal of the windshield and saves the cost of windshield replacement. The practically of an acceptable glass crack repair is principally due to the fact that the index of refraction of the resin is substantially the same as that of the glass.

A crack in glass is visible because as light rays pass the boundary between the glass and the air in the crack they are bent due to the difference in the speed of light in glass as compared with the speed in air. Light that is reflected back from such boundaries comes at a different angle than if there were no crack and hence the eyes and brain of the observer sense the discontinuity. Index of refraction for any material is a ratio of the speed of light in that material compared to the speed in a vacuum. If two materials have the same index of refraction there will be no bending of the light rays at a boundary between the materials and an observer will not sense the discontinuity. Thus a crack filled with such a resin will essentially seem to disappear.

There are different formulations of resins. Some are aerobic or "air drying" and others are cured or hardened by radiating them with ultraviolet light which is usually provided by a lamp made for this purpose. The aerobic resins come in two parts and are mixed before use. Their curing begins from the time of mixing whereas the cure of the ultraviolet types begins when they are subjected to the ultraviolet light.

Automobile windshields are typically made of a "sandwich" of two layers of glass laminated to an inner layer of resin material such as polybutyral.

The windshield has a periphery which defines a glass area withing the periphery for each glass layer. The glass area for each layer has an outer exposed surface and an inner surface in contact with the inner plastic (polybutyral) layer. Also, for each glass layer there is an edge defined by the periphery extending between the outer surface and the inner surface joining these surfaces at an angle such as 90° to form a corner. Many types of breaks may occur in such windshields. One, which is usually caused by the impact of a rock, is called a "bullseye". A bullseye is a type of a stone break which has a circular appearance. It often has a cone shaped piece of glass detached from the outer layer. The apex of the cone faces the outer surface and the base of the cone may be forced partly into the inner layer. The apex may or may not connect to the outer atmosphere.

Sometimes the impact of a rock or other object will result in small radiating cracks from the impact point and is then called a "star break". A combination of a bullseye and a star, called a "combination break", can also occur. Impacts often cause linear cracks in windshields. They may originate at a stone break or may, instead, originate at a point. They may extend to the glass edge or they may terminated at another point.

Various tools have been proposed to aid in filling stone breaks with resin. One is described in U.S. Pat. No. 3,993,520 to Werner and utilizes an injector assembly having a piston inside a cylinder. When the piston is depressed the resin is injected out the open end of the cylinder and into the stone break. The assembly is held to the surface of the glass by suction cups.

A similar apparatus with an adjustable arm is disclosed in U.S. Pat. No. 4,291,866 to Petersen. A variation of the Werner apparatus is in U.S. Pat. No. 4,569,808 to Smali while U.S. Pat. No. 4,744,841 to Thomas utilizes vibration and heat. An apparatus with a spring loaded air exit is disclosed in U.S. Pat. No. 4,775,305 to Alexander and U.S. Pat. No. 4,814,185 to Jones has a side tube for introduction of the resin. The use of vacuum to aid the resin injection is explored in U.S. Pat. No. 4,820,148 to Anderson and U.S. Pat. No. 4,919,602 to Janszen. Other related patents are U.S. Pat. No. 4,419,305 to Matles and U.S. Pat. No. 4,385,879 to Wilkinson.

As far as is known, the background art discussed above was designed for stone breaks rather than long cracks (over six inches).

Short cracks are seen as small dots on the surface of the glass, or as a bullseye, a star-break, a combination bullseye and star break, and sometimes as variants on these configurations. It is well known that stone breaks are "unsurfaced" that is they extend below the surface of the glass; or if they do extend to the surface they are so tight that they must be treated as unsurfaced when being repaired. Thus the prior repair methods and equipment employ application of vacuum at an entry location which is the impact spot which caused the damage, followed by injection of resin under pressure to flow into the crack. This is called "stone damage art". In this manner the resin replaces the air in the crack. However, stone damage art cannot be used to repair cracks which are "surfaced", that is where the crack is open at the surface of the glass. Such cracks have been consistently referred to in the art as over 6 inches in length. There has been an inability to effectively repair cracks over 6 inches, and a long felt need for a method and equipment to do so. Stone damage art employs resin viscosity normally in the range of 10-30 c.p.s., but not exceeding about 50 c.p.s. In general the viscosity must be low enough to easily flow in the tight cracks around a stone break. Thus a thin watery viscosity has been desired.

Most such long cracks have an end which terminate at a location on the glass area which is neither the edge nor the point of impact. This termination location is called a "point". The point itself is very tight and locally may be unsurfaced. Further most such long cracks will extend from a point to the edge of the glass with an impact location intermediate these ends. Other such long cracks will radiate from an impact location to the glass edge or to a point. Frequently the crack will extend in two opposite directions from an impact point, ending in a point in one direction and at an edge in the other direction. Some cracks terminate at a point at each end. Sometimes a Y formation will appear. A surfaced crack will usually be unsurfaced immediately proximate a point.

DISCLOSURE OF INVENTION

In accordance with an embodiment of the present invention, a kit is disclosed having bars, suction cups, pressure bolts, nuts and an injector assembly. The injector assembly has a piston operating in a cylinder. The piston has O rings that effect a seal with the cylinder walls. The cylinder is used to hold the resin and has an O ring at its lower end which bears upon the glass. The parts of the kit may be assembled into three glass repair tools.

The first is a repair bridge tool. This tool has two suction cups for holding a frame, made of two bars, on the glass. It has an injector assembly for injecting resin into the glass crack and it has a nylon pressure bolt which, in conjunction with the vacuum cups, holds the injector assembly O ring firmly against the glass. The piston may be rotated away from the glass to create a vacuum for removal of air from a crack or it may be rotated towards the glass to exert pressure on the resin. The pressure causes the resin to flow into the crack.

A second tool which may be assembled from the kit is the crack opener. The crack opener has a bar, two suction cups and a pressure bolt. The suction cups hold the crack opener on the glass. The pressure bolt may then be rotated downward into contact with the glass. When used on the inner side of a windshield the crack opener causes the crack to open so that resin may be injected with the repair bridge.

A third tool, that may be assembled from the glass repair kit, is the repair bar tool. This tool is similar to the repair bridge except it has a simpler frame of a single bar. The repair bar may also be used to remove air from a crack or inject resin into a crack. It may be used in conjunction with a repair bridge tool.

In accordance with an aspect of the present invention, methods of use of the glass repair kit are disclosed. One method is used to fill cracks in the outer glass layer of a windshield that extend from a point to the edge of the glass. A small bullseye is created at the point of the crack to relieve stress on the point. The bullseye is created by impacting the glass with a pointed object. A repair bridge is used to first vacuum air out of the bullseye and then to fill the bullseye with resin.

A crack opener tool is then installed on the inside of the glass to open the crack near the bullseye. The repair bridge may then be slid along the crack with the crack opener to the glass edge. The pressure on the resin in the injector assembly causes the resin to flow into the crack. The resin is covered with plastic tabs to contain it and irradiated with ultraviolet light to cure it, after which the plastic tabs may be removed.

In accordance with another aspect of the current invention a second method of use of the kit to fill a crack running from a point to the glass edge is disclosed. In this method of use the crack opener tool is employed to open the crack near the point. The repair bridge is then used to fill the crack with resin by starting at the glass edge and sliding towards the point. A bullseye is created by impact at the point after which the repair bridge is used to pull air from the bullseye and, finally, to fill the bullseye and the crack portion near the point with resin. The resin is retained and cured as before.

Two repair bridges are utilized in a third disclosed method of use. A bullseye is created by impacting the glass at the point of the crack with a pointed tool. One repair bridge is mounted over the bullseye and set so as to draw a vacuum on the bullseye. A crack opener tool is mounted on the inside of the glass near the bullseye to open the crack. A second repair bridge is employed to fill the crack with resin starting at the glass edge. The second repair bridge fills the crack as it is slid along the crack to near the bullseye. Finally the first repair bridge at the bullseye is set to exert pressure and inject resin into the bullseye and crack. The resin is retained and cured as before.

A fourth method of use of the repair kit is disclosed to fill a crack in the outer glass layer which extends from a first point to a second point rather than to the glass edge. Two crack opener tools are used near each point to open the crack. A repair bridge is employed to fill the crack from near the first point to near the second point. A bullseye is created at each point and the repair bridge is used to remove air from and insert resin into each bullseye in turn. The resin is retained and cured as before.

The novel features of the invention are set forth with particularity in the appended claims. The invention will be best understood from the following description when read in conjunction with the accompanying drawings.

BRIEF DESCRIPTION OF DRAWINGS

Incorporated as part of the description, in order to illustrate embodiments and principles of the present invention, are the accompanying drawings, wherein:

FIGS. 14A-D are a series of sectional views along the line 14—14 of FIG. 13;

MODES FOR CARRYING OUT THE INVENTION

Figure 1:
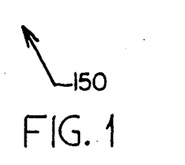
FIG. 1 illustrates the elements of a glass repair kit.

In accordance with an embodiment of the present invention, a kit 150 is illustrated in FIG. 1 for the assembly of glass crack repair tools. With the parts shown a repairman can quickly assemble the glass crack repair tools needed for a crack repair. When the repair is concluded the parts can be disassembled and stored in a tool case or other convenient carrier for transportation to the next job. It may be desirable for some repair tasks to have available more than one of some of the parts of the kit 150. The exact number will depend upon the tools that one wishes to assemble. The parts of the kit 150 will be described first and then the tools that may be assembled from the parts will be shown.

Figure 1A:
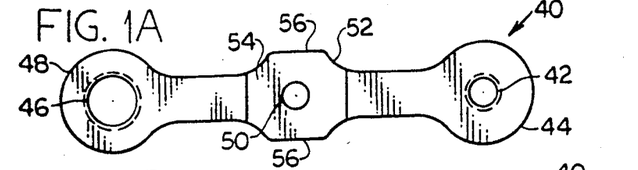
FIG. 1A is a plan view of a first bar.
Figure 1B:
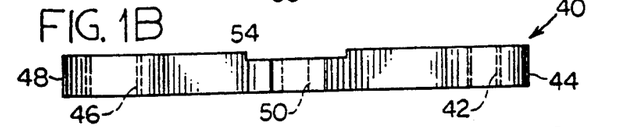
FIG. 1B is an elevation view of the first bar of FIG. 1A.
Figure 1C:
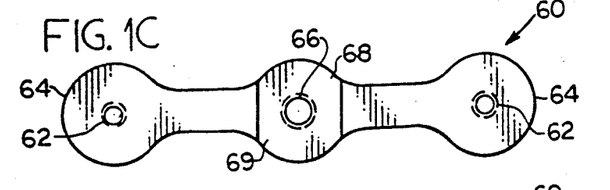
FIG. 1C is a plan view of a second bar.
Figure 1D:
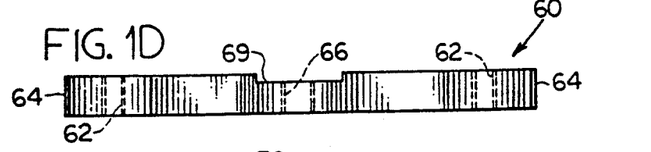
FIG. 1D is an elevation view of the second bar of FIG. 1C.

FIG. 1A is a plan view of the first bar 40 and FIG. 1B is an elevation view of the first bar 40. The first bar 40 has a threaded hole 42 in one end 44, a larger diameter threaded hole 46 in the other end 48 and a through hole 50 in the middle 52. The middle 52 also has a recess 54 and a flat 56 on each side of the recess 54. FIG. 1C is a plan view of the second bar 60 and FIG. 1D is an elevation view of the second bar 60. The second bar 60 has small diameter threaded holes 62 in each end 64 and a larger diameter threaded hole 66 in the middle 68. The middle 68 also has a recess 69.

Figures 1E, 1F, 1G, 1H:
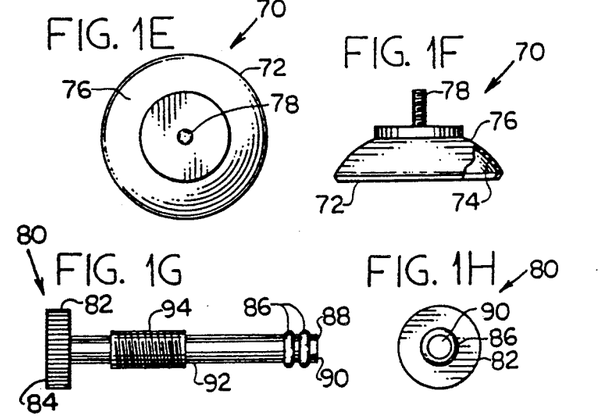
FIG. 1E is a plan view of a suction cup.
FIG. 1F is an elevation view of the suction cup of FIG. 1E.
FIG. 1G is an elevation view of a piston.
FIG. 1H is a plan view of the piston of FIG. 1G.

FIG. 1E is a plan view and FIG. 1F is an elevation view of the suction cup 70. The suction cup 70 has a cup 72 made of resilient material such as synthetic rubber. The cup 70 has a cup side 74 and a side opposite 76. A threaded bolt 78 extends from the side opposite 76.

FIG. 1G is an elevation view and FIG. 1H is a plan view of the piston 80. The piston 80 has a knurled knob 82 at one end 84 and two O rings 86 that fit into annular grooves 88 in the other end 90. The middle 92 of the piston 80 has a larger diameter with threads 94.

Figure 1J:
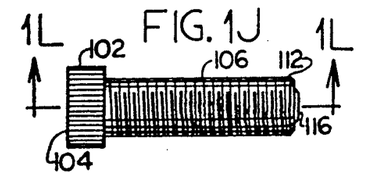
FIG. 1J is an elevation view of a cylinder.
Figure 1K:
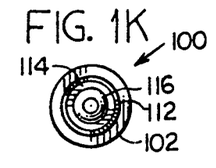
FIG. 1K is a plan view of the cylinder of FIG. 1J.
Figure 1L:
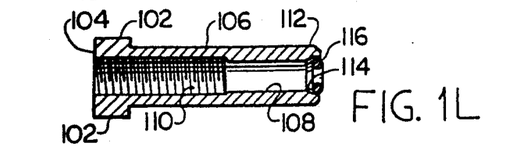
FIG. 1L is a view along the line 1L—1L of FIG. 1K.

FIG. 1J is an elevation view and FIG. 1K is a plan view of the cylinder 100 which has a knob 102 at one end 104 and threads 106 on the body. FIG. 1L is a view along the line 1L—1L in FIG. 1J showing a bore 108 with internal threads 110 in a larger diameter. The end 112 has an annular groove 114 into which the O ring 116 fits.

Figure 1M:
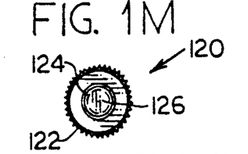
FIG. 1M is a plan view of a bolt.
Figure 1N:
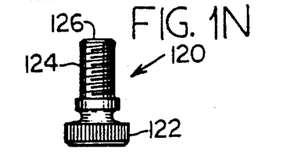
FIG. 1N is an elevation view of the bolt of FIG. 1M.
Figure 1P:
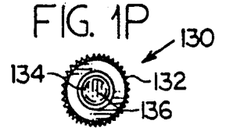
FIG. 1P is a plan view of a pressure bolt.
Figure 1Q:
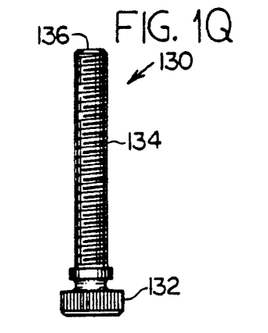
FIG. 1Q is an elevation view of the pressure bolt of FIG. 1P.
Figure 1R:
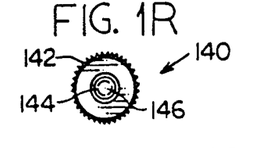
FIG. 1R is a plan view of a nut.
Figure 1S:
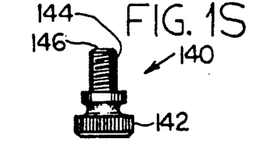
FIG. 1S is an elevation view of the nut of FIG. 1R.

FIG. 1M is a plan view and FIG. 1N is an elevation view of the bolt 120. The bolt 120 has a knob 122 and threads 124 on the end 126. FIG. 1P is a plan view and FIG. 1Q is an elevation view of the pressure bolt 130. The pressure bolt 130 has a knob 132 and threads 134 on the end 136. FIG. 1R is a plan view and FIG. 1S is an elevation view of the nut 140. The nut 140 has a knob 142 and internal threads 144 on the end 146.

Thus the kit 150 has the first bar 40, the second bar 60, the suction cup 70, the piston 80, the cylinder 100, the bolt 120, the pressure bolt 130, and the nut 140. The bolt 120, the pressure bolt 130 and the nut 140 may be made of a material such a nylon that will not scratch glass. The first bar 40, the second bar 60, the piston 80 and the cylinder 100 may be made of a light material such as aluminum or plastic. The bolt 78 may be made of a suitable material such as steel or aluminum.

Figures 2, 3, 4, 5:
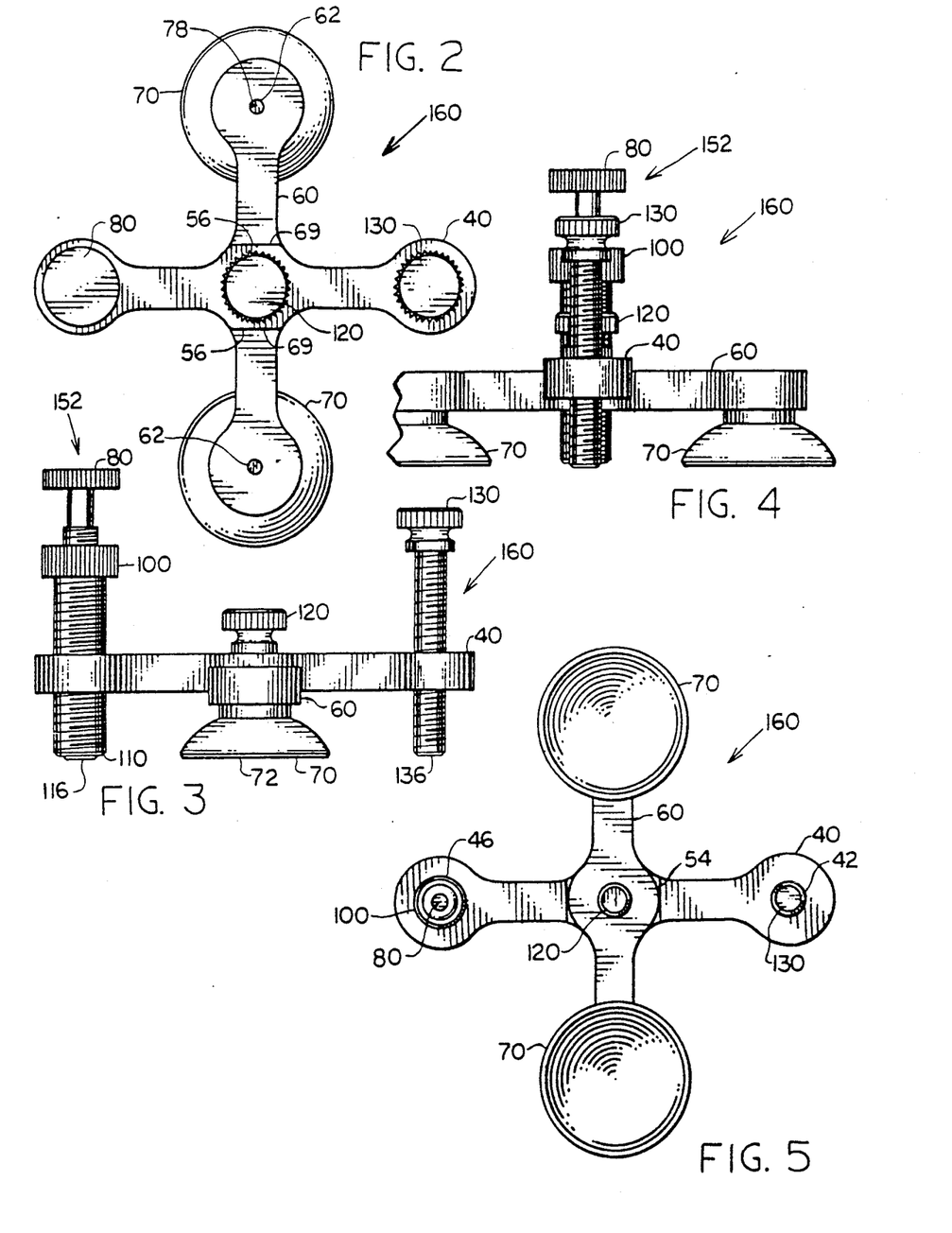
FIG. 2 is a plan view of a repair bridge tool.
FIG. 3 is a front elevation view of the repair bridge tool of FIG. 2.
FIG. 4 is a side elevation view of the repair bridge tool of FIG. 2.
FIG. 5 is a bottom plane view of the repair bridge tool of FIG. 2.

The kit 150 may be assembled into several glass crack repair tools. One is the repair bridge 160 illustrated in the plan view of FIG. 2, the front elevation view of FIG. 3, the side elevation view of FIG. 4 and the bottom plan view of FIG. 5. The repair bridge 160 is constructed with the first bar 40 placed over the second bar 60 with the recess 54 of the first bar 40 placed against the recess 69 of the second bar 60 and secured with the bolt 120 which passes through the hole 50 in the first bar 40 and threads into the threaded hole 66 in the second bar 60. The first bar 40 is held substantially orthoganal to the second bar 60 by the flats 56 of the first bar 40 bearing against the sides of the recess 69 of the second bar 60.

The bolts 78 of two suction cups 70 are screwed into the threaded holes 62 of the second bar 60. The pressure bolt 130 is threaded into the threaded hole 42 of the first bar 40.

An injector assembly 152 is constructed by threading the piston 80 into the cylinder 100 so that the O rings 86 of the piston 80 are adjacent the O ring 116 of the cylinder 100 when the piston 80 is threaded all the way in. The injector assembly 152 is threaded into the larger diameter hole 46 of the first bar 40. The cup 72, the threaded end 136 of the pressure bolt 130, and the end 110 of the cylinder 100 all face the same direction relative to the first bar 40.

The repair bridge 160 may be held on a glass surface by the suction cups 70. If the cups 72 are coated with a means for lubrication such as petroleum jelly, the repair bridge may be slid along the glass surface. By rotating the pressure bolt 130 and the cylinder 100 towards the glass surface the O ring 116 of the cylinder 100 may be compressed against the glass surface. It may be appreciated that the piston may then be rotated towards the glass to create pressure in the bore 108 (FIG. 1L) of the cylinder 100 or may be rotated away from the glass to create a vacuum in the bore 108. When a vacuum is created in the bore 108, air will be pulled from a crack that is surrounded by the O ring 116. When a pressure is created in the bore 108, resin placed in the bore 108 will be forced into a glass crack that is surrounded by the O ring 116.

Figure 6:
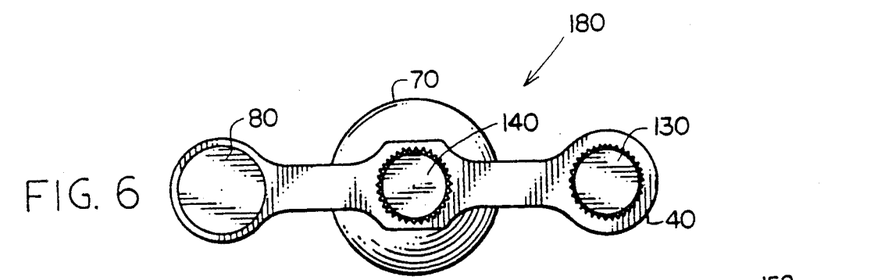
FIG. 6 is a plan view of a repair bar tool.
Figure 7:
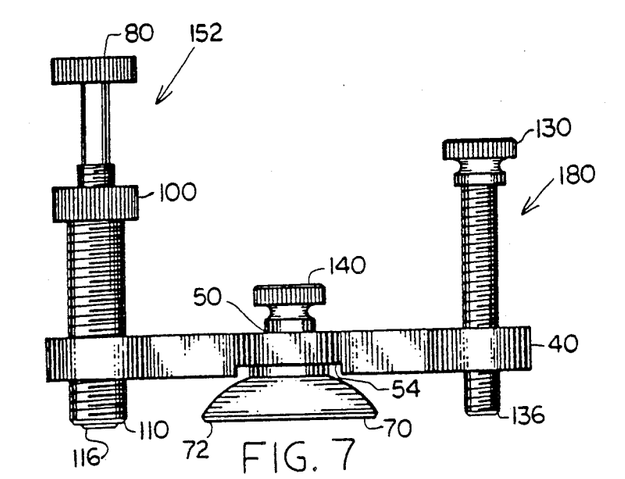
FIG. 7 is a front elevation view of the repair bar tool of FIG. 6.
Figure 8:
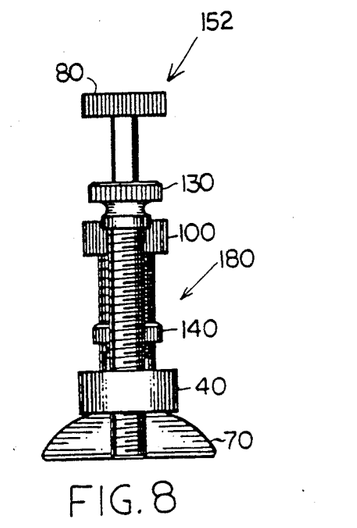
FIG. 8 is a side elevation view of the repair bar tool of FIG. 6.
Figure 9:
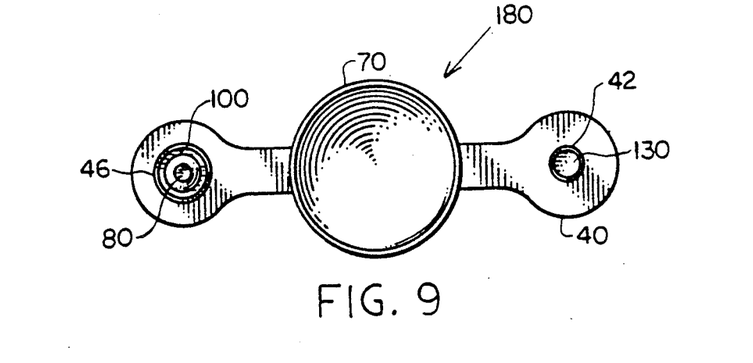
FIG. 9 is a bottom plan view of the repair bar tool of FIG. 6.

A second glass repair tool that may be assembled from the kit 150 is the repair bar 180 illustrated in the plan view of FIG. 6, the front elevation view of FIG. 7, the side elevation view of FIG. 8 and the bottom plan view of FIG. 9. The repair bar 180 construction begins with a suction cup 70 placed in the hole 50 and against the recess 54 of the first bar 40 and secured by threading the nut 140 over the bolt 78 (FIG. 1F) of the suction cup 70. The pressure bolt 130 is threaded into the threaded hole 42 of the first bar 40.

An injector assembly 152, assembled as described above for the assembly of the repair bridge 160, is integrated in the repair bar 180 by threading it into the larger diameter hole 46 of the first bar 40. The cup 72 of the suction cup 70, the threaded end 136 of the pressure bolt 130, and the end 110 of the cylinder 100 all face the same direction relative to the first bar 40. As described above for the repair bridge 160, the injector assembly 152 may be used to draw air from a crack surrounded by the O ring 116 or to insert resin, placed in the bore 108 (FIG. 1L), into the crack.

Figure 10:
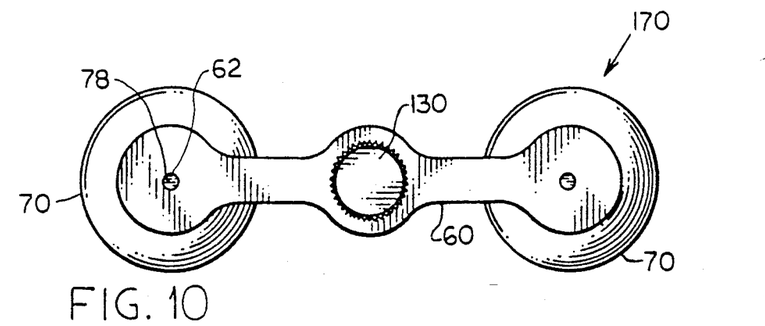
FIG. 10 is a plan view of a crack opener tool.
Figure 11:
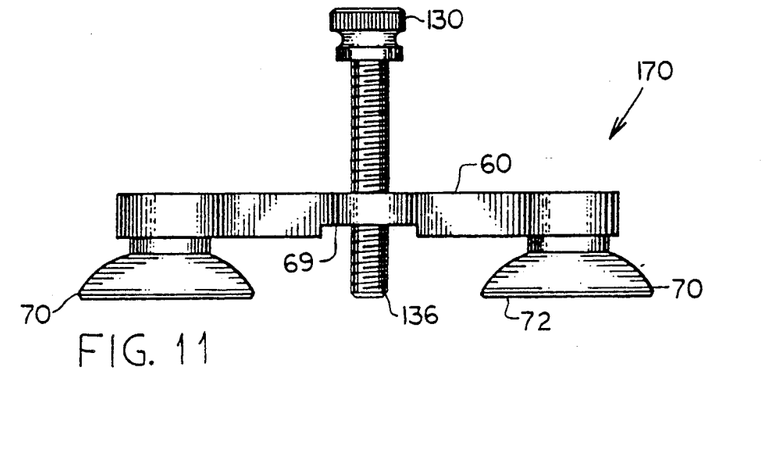
FIG. 11 is a front elevation view of the crack opener tool of FIG. 10.
Figure 12:
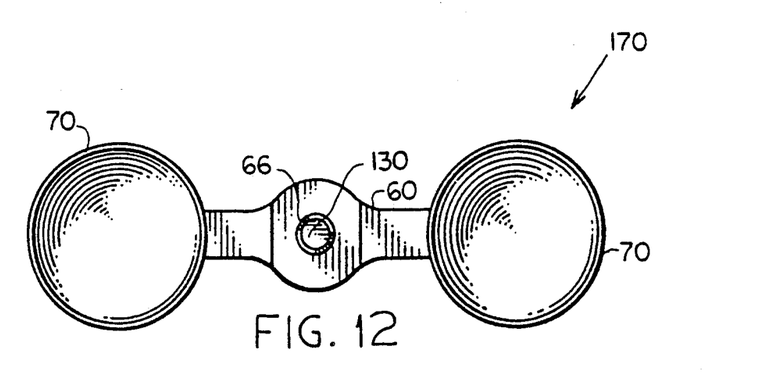
FIG. 12 is a bottom plan view of the crack opener tool of FIG. 10.

A third glass repair tool which may be assembled from the kit 150 is the crack spreader 170 as illustrated in the plan view of FIG. 10, the elevation view of FIG. 11 and the bottom plan view of FIG. 12. The bolt 78 (FIG. 1F) of a suction cup 70 is threaded into each of the threaded holes 62 of a second bar 60. A pressure bolt 130 is threaded into the threaded hole 66 of the second bar 60. The cups 72 of the suction cups 70 and the end 136 of the pressure bolt 130 face the same direction relative to the second bar 60. The recess 69 of the second bar 60 is shown in FIG. 11 to also face the same direction although this is optional.

The crack spreader 170 may be placed on the inside of a windshield with the suction cups 70 stradling the crack in the outer glass layer of the winshield. When the pressure bolt 130 is rotated so as to cntact the glass surface with it end 136, the suction cups 70 resist by pulling on the inner glass layer and the crack in the outer layer is caused to spread apart. This allows easier flow of resin into the crack. The crack spreader 170 can be slid along the crack just in front of the injector.

Methods of use of the embodiment of the present invention are illustrated in FIGS. 13-21. Many of the methods of use concern the repair of a crack that starts at a point and runs either to the glass edge or to another point. If the crack does run to a point rather than to a bullseye it is advantageous to create a small bullseye at the point. This relieves strain on the point preventing further spreading of the crack and also provides an injection point for resin.

Figure 13:
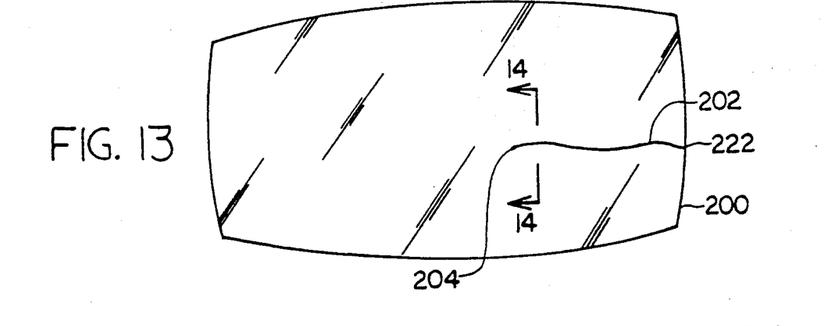
FIG. 13 is a perspective view of a windshield with a crack.

FIG. 13 and FIGS. 14A-D show the creation of a bullseye at a point. In the methods of use that follow, the words "tap a bullseye" or the like, will be understood to refer to this process. FIG. 13 illustrated a front view of a windshield 200 that has a crack 202 originating at a point 204 and running to the glass edge 222. To create a small bullseye at the point 204 the steps of FIGS. 14A-D, which are a series of sectional views along the line 14—14 of FIG. 13, should be followed.

Figure 14A:
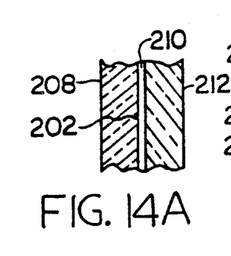
FIG. 14A illustrates a crack in the outer glass layer of a windshield.
Figures 14B, 14C:
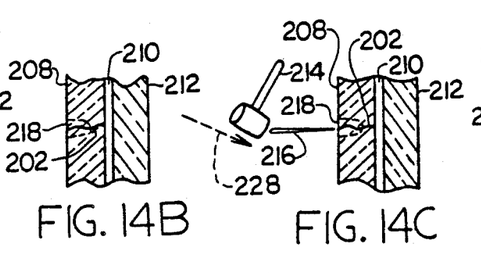
FIG. 14B illustrates a hole drilled at the point of the crack of FIG. 14A.
FIG. 14C illustrates tapping a bullseye in the hole of FIG. 14B.

In FIG. 14A the crack 202 is seen in the outer glass layer 208. The inner glass layer 212 and the polybutyral layer 210 complete the section of the windshield. The first step to tap a bullseye is to drill a small hole 218 of diameter between one sixty fourth and one fourth of an inch in diameter approximately one half to three fourths of the way through the outer glass layer 208 as shown in FIG. 14B. Then a means for striking such as a small mallet 214 is used with a means for transferring force to a point such as a sewing machine needle 216. The needle 216 is placed in the hole 218 and tapped by swinging the mallet 214 in the direction 228 as shown in FIG. 14C. A razor blade holder may also be used for the means for striking. The result is shown in FIG. 1D where a small cone 220 of glass has been broken loose from the outer glass layer.

Figure 14D:
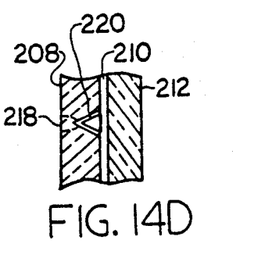
FIG. 14D illustrates the bullseye created at the point of the crack in FIG. 14C.

Consequently a passageway is ensured through the outer glass layer 208 to enable the flow of resin into the crack.

Figure 15:
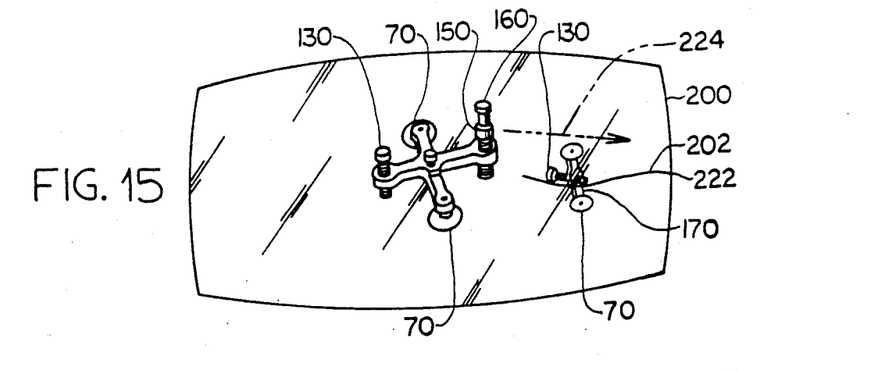
FIG. 15 is a perspective view of a method of filling a crack in a windshield.
Figure 16:
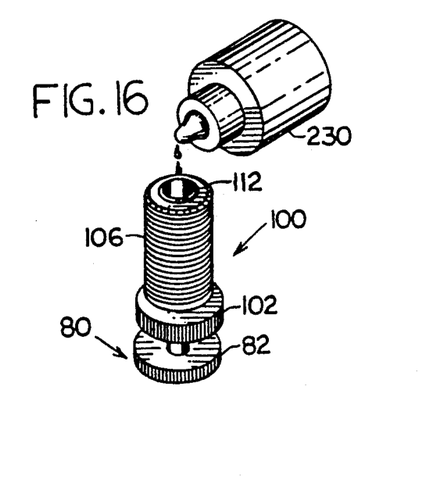
FIG. 16 illustrates the applying of means of lubrication to the vacuum cups of the repair bridge of FIG. 15.
Figure 17:
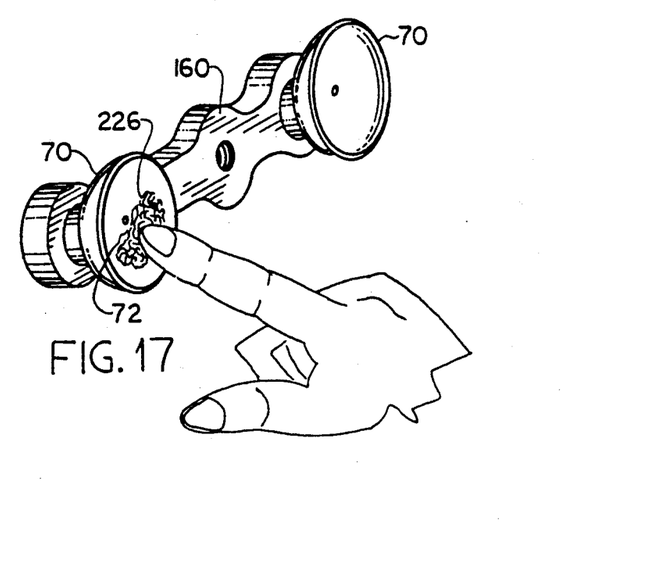
FIG. 17 illustrates the filling of the cylinder bore of FIG. 15 with resin.

FIG. 15 is a perspective view of the windshield 200 with the crack 202 running from a point (FIG. 13) to the glass edge 222. The first step in this method of crack repair is to tap a bullseye (as described above and shown in FIG. 14) at the point of the crack 202. The piston 80 is assembled with the cylinder 100 and resin 230 is then placed through the end 112 into the bore 108 of the cylinder 100 as shown in FIG. 16. The number of drops of resin 230 to use should be approximately the crack length in inches minus two. Means for lubrication such as petroleum jelly 226 is placed on the cup 72 of the suction cups 70 as illustrated in FIG. 17. The repair bridge 160 is then placed on the glass in FIG. 15 with the suction cups 70 compressed so as to hold the repair bridge 160 in place. The cylinder 100 and the pressure bolt 130 are both rotated downwards towards the glass until the O ring 116 (FIG. 1L) in the end of the cylinder 100 is compressed against the glass with the O ring 116 centered over the bullseye.

The piston 80 is then rotated away from the glass to create a vacuum in the bore 108 (FIG. 1L) which pulls the air out of the bullseye. The piston 80 is then rotated towards the glass and the pressure on the resin in the bore 108 causes the resin to flow into the bullseye and part way down the crack 202. Means for applying pressure such as the crack opener 170 is placed on the inside of the windshield 200. The pressure bolt 130 of the crack opener 170 is rotated towards the glass until it and the suction cups 70 of the crack opener 170 have applied enough force to open the crack slightly.

The repair bridge 160 and crack opener 170 may then be slid along the crack 202 in the direction 224 to the edge 222 keeping the O ring 116 centered over the crack 202. The crack 222 will fill with resin forced out of the bore 108 by the pressure exerted by the piston 80. The repair bridge 160 and the crack opener 130 are then removed from the glass.

Figure 18:
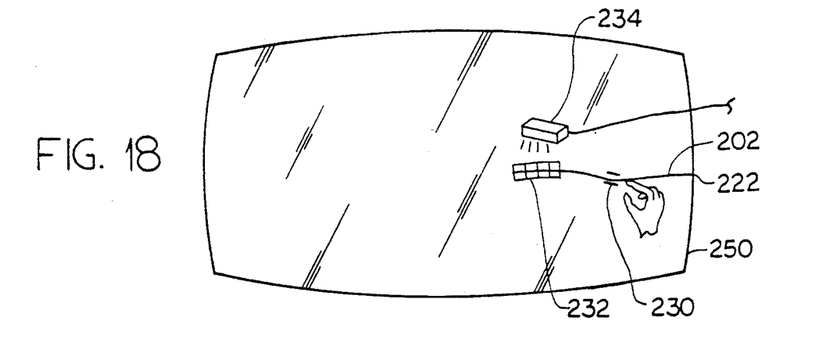
FIG. 18 is a perspective view of the applying of resin to a filled crack, placement of tabs and irradiation with ultraviolet light

Resin 230 is then spread over the bullseye and the crack 202 as shown in FIG. 18, which is a perspective view of the windshield 200, and means for retaining the resin such as plastic tabs 232 are placed on the resin 230. The plastic tabs serve to keep air out of the crack and help it cure faster. Finally, the resin 230 is irradiated with ultraviolet light from an ultraviolet source 234 to cure it. The tabs 232 may then be removed and excess resin removed with a blade. Finally the glass may be cleaned with a glass cleaner being careful to not get cleaner on the fresh resin.

Figure 19:
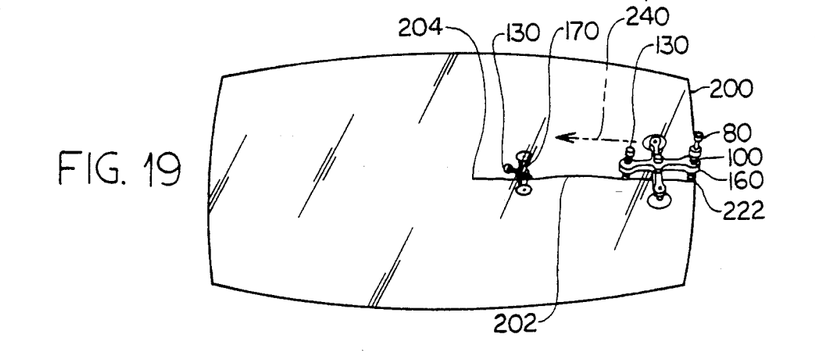
FIG. 19 is a perspective view of a second method of filling a crack in a windshield.

In FIG. 19 a second method of filling a crack 202 in a windshield 200 is illustrated. A crack opener 170 is placed on the inside of the windshield 200 one to four inches from the point 204. The pressure bolt 130 is rotated towards the glass until the crack is opened slightly. The suction cups 70 of a repair bridge 160 are coated with petroleum jelly as shown in FIG. 17. The piston 80 and cylinder 100 are assembled and resin 230 is placed in the end 112 of the bore 108 as shown in FIG. 16. The length of the crack in inches less two is the number of drops of resin 230 to use.

The repair bridge 160 is placed at the edge 222 of the crack 202 and the cylinder 100 and pressure bolt 130 turned towards the glass until the O ring. 116 (FIG. 1L) is compressed against the glass and centered over the crack 202 at the edge 222. The piston 80 is turned towards the glass to create pressure on the resin in the bore 108. The repair bridge 160 is then slid along the crack 202 in the direction 240 keeping the O ring 116 centered over the crack 202 so as to fill the crack 202 with resin. Stop the repair bridge with the O ring 116 one to three inches from the point. The last part of the crack is the tightest and thus hardest to fill.

The repair bridge 160 and crack opener 170 are then removed from the glass. Resin 230 is then spread over the filled portion of the crack 202 as shown in FIG. 18 and plastic tabs 232 are placed on the resin 230. Finally, the resin 230 is irradiated with ultraviolet light from an ultraviolet source 234 to cure it.

A bullseye is tapped at the point 204 as described above and shown in FIGS. 14A-D. The repair bridge 160 is then placed on the glass as before but with the O ring 116 centered over the bullseye. The piston 80 is then rotated away from the glass to create a vacuum in the bore 108 (FIG. 1L) which pulls the air out of the bullseye. The piston 80 is then rotated towards the glass and the pressure on the resin in the bore 108 will cause the resin to flow into the bullseye and part way down the remaining portion of the crack 202.

The repair bridge 160 is then removed from the glass. Resin 230 is then spread over the bullseye and the remaining portion of the crack 202 and plastic tabs 232 are placed on the resin 230 as shown in FIG. 18. The resin 230 is irradiated with ultraviolet light from an ultraviolet source 234 to cure it. The tabs 232 may then be removed and excess resin removed with a blade. Finally the glass may be cleaned with a glass cleaner being careful to not get cleaner on the resin.

Figure 20:
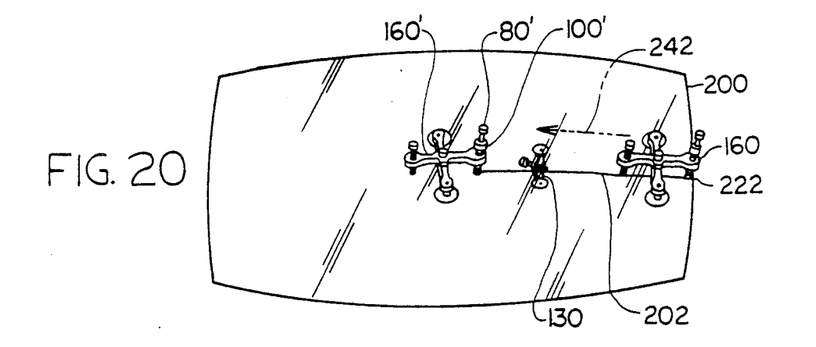
FIG. 20 is a perspective view of a third method of filling a crack in a windshield.

A third method of repairing glass cracks is illustrated in FIG. 20. It differs from the second method just described in that a bullseye is initially tapped at the point 204 of the crack 202 (FIG. 19). Then a second repair bridge 160' with resin 230 in the cylinder 100' (as in FIG. 16) is placed over the bullseye and the piston 80' is turned away from the glass to create a vacuum over the bullseye. The second repair bridge is left at the bullseye and the remainder of the repair proceeds as described above in the second method and as shown in FIG. 19. After the first repair bridge has been slid in the direction 242 to fill the crack 202 to within one to three inches of the bullseye, it is removed from the glass. The piston 80' of the second repair bridge 160' is turned towards the glass to create pressure on the resin 230 in the cylinder 100' which will cause the bullseye and the remaining portion of the crack 202 to fill with resin 230. The spreading of resin 230 over the filled crack and bullseye, placement of tabs 232, irradiation with an ultraviolet light source 234 and cleanup with a blade and window cleaner is as described for the second method and illustrated in FIG. 18.

Figure 21:
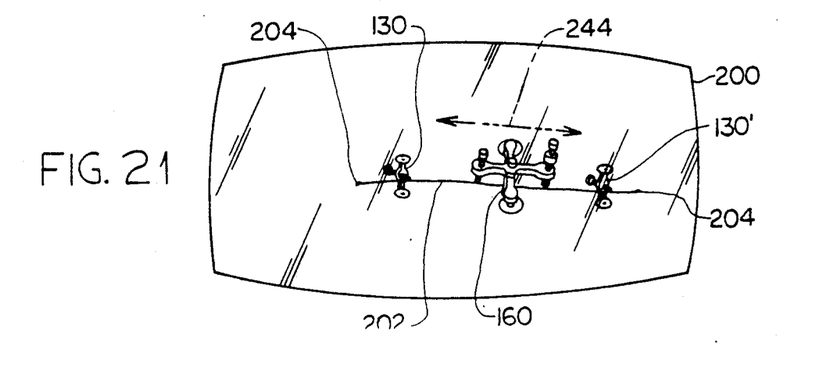
FIG. 21 is a perspective view of a fourth method of filling a crack in a windshield.

A fourth method of repairing a glass crack 202 in a windshield 200 is illustrated in FIG. 21. In this case the crack 202 runs from a point 204 to a second point 204'. Two cracks openers 130 and 130' are placed on the inside of the glass one to four inches from each point to open the crack 202 in a method previously described. A repair bridge 160 is used along the direction 244 as previously described in the other methods to fill the crack to within one to three inches of each point 204, 204'. A bullseye is tapped at each point 204, 204'. The repair bridge 160 then used to remove air from one bullseye and fill it with resin. This is repeated at the other bullseye. Covering with resin, placement of plastic tabs, radiation with ultraviolet light, and cleanup is as previously described for other methods and as shown in FIG. 18.

In the methods for filling glass cracks described above, means for applying pressure were used to spread the glass crack near the point of the crack to make it easier to inject resin into the crack. It was disclosed that a crack opener 170 as shown in FIG. 10 may be used. A repair bridge 160 (FIG. 2) may also be used as may the hands, thumb or fingers of the repair man. It helps, if using the hand or thumb to coat with means for lubrication, such as petroleum jelly, so the pressure can be moved smoothly along the glass.

In the methods for filling glass cracks described above, it should also be appreciated by those skilled in the art that the repair bar tool 180 (FIGS. 6, 7, 8 and 9) may be substituted for the repair bridge tool 160 (FIGS. 2, 3, 4 and 5) where desired. The repair bar tool 180 may also be substituted for one or both repair bridge tools 160 where two repair bridge tools 160, 160' were used, as in the third method shown in FIG. 20.

Resin 230 (FIG. 16) is available in a range of viscosities. In general as high viscosity as possible should be used because the completed repair will be more likely to remain clear of spots and lines of refraction. High viscosity also keeps the repair from splitting apart due to temperature changes and stress. However, because it is hardest to get the resin to flow near the point of a crack, lower viscosity resin may be used there. The colder the climate, the higher the viscosity should be. When performing crack repairs in cold weather the glass must be warmed gradually before starting.

The cure time, which is the time during which the resin is irradiated with ultraviolet light, is five to seven minutes. If, after curing, a thin line of refraction appears, this can be resolved by drilling into the crack in the middle of this line and using the repair bridge 160 in both the vacuum and pressure mode to inject resin.

Sometimes the crack does not come to the surface of the glass. In those cases a hole should be drilled into the crack and a bullseye tapped. Then a repair bridge 160 may be placed over the bullseye in the pressure mode. Another hole is drilled three to four inches further down the crack and another bullseye tapped. Another repair bridge 160 or a repair bar 180 is placed over this bullseye in the vacuum mode. This will cause resin to flow from the first bullseye to the second. This process may be repeated down the crack to fill all of it.

Although the present invention has been described with reference to preferred embodiments, numerous modifications and rearrangements can be made with the equivalent result still embraced within the scope of the invention.

What is claimed is:

1. A method of repairing a crack in a windshield having two layers of glass and a plastic layer between the two glass layers the crack being in one layer and being over 6 inches in length and having at least one first point at one end of the crack and the crack extending to a second point or to the edge of the glass at the other end of the crack defining a length of the crack which is surfaced comprising;

creating a bullseye proximate each of said at least one point;

applying a vacuum at each bullseye to remove air from the bullseye;

applying a first resin having a preselected viscosity under pressure at each bullseye to cause resin to flow into the bullseye and part way down the crack;

applying pressure on the reverse side of the windshield to open the crack in at least a portion thereof to facilitate entry of resin therein;

progressively applying higher viscosity resin having a preselected viscosity which is higher than the viscosity of the first resin under pressure along the crack to fill the crack with resin;

releasing pressure on the reverse side after application of resin in the crack.

2. The method of claim 1 wherein the crack has point at the first end and extends to an edge at the second end and wherein resin is first applied to the bullseye and thereafter resin is applied to the crack.

3. The method of claim 2 wherein resin is applied to the crack commencing from proximate the bullseye at the point joining continuously with the resin previously applied in the bullseye, progressively to the edge at the second end.

4. The method of claim 3 wherein the exposed resin is covered with a retaining means.

5. The method of claim 4 wherein the resin is caused to be cured.

6. The method of claim 5 wherein a second application of resin not under pressure is performed overlying the previously applied resin prior to covering with a retaining means.

7. The method of claim 6 wherein the resin of the second application is of high viscosity relative to the viscosity of the resin in the crack.

8. The method of claim 3 wherein the pressure applied on the reverse side is applied in a localized area commencing near the bullseye and is progressively moved at least part way toward the edge as resin is applied in the crack.

9. A method of repairing a crack in a windshield having two layers of glass and a plastic layer between the two glass layers and each glass layer having a periphery defining a glass area having an outer surface within the periphery and having at least one edge joining the glass area at the periphery the crack being in one layer and being over six inches in length and having a first end within the glass area and a second end either within the glass area or at the edge of the glass and defining a length of the crack which is surfaced comprising;

ensuring a passageway at each end of the crack which is in the glass area for flow of resin from the outer surface into the crack upon the application of vacuum and the injection of resin from the outer surface;

applying a vacuum to each end of the crack which is in the glass area and which has been prepared;

injecting under pressure a first resin having a preselected viscosity to flow into the crack, to each end of the crack which is in the glass area and which has been prepared to cause resin to flow into the crack and part way down the crack;

progressively applying resin having viscosity which is higher than that of the first resin, along the surfaced length of the crack;

causing the resin to cure.

10. The method of claim 9 wherein at least one of the first or second ends of the crack is in the glass area and terminates at a point, the step of preparing said at least one end comprising;

creating an opening from the surface proximate said point to join with the point.

11. The method of claim 10 wherein the first end of the crack terminates at a point and the second end of the crack terminates at the edge of the glass comprising;

applying said vacuum and said first resin to said first end of the crack at the opening and thereafter applying said higher viscosity resin progressively to said surfaced length of the crack.

12. The method of claim 11 wherein said higher viscosity resin is progressively applied commencing from proximate said point joining continuously with the first resin previously applied in the opening, progressively to the edge of the glass.

13. The method of claim 9 further comprising applying pressure on the reverse side of the windshield along the crack to open the crack in at least a portion thereof to facilitate entry of said higher viscosity resin therein and releasing said pressure after application of said higher viscosity resin in the crack.

14. The method of claim 13 wherein the exposed resin is covered with a retaining means prior to curing.

15. The method of claim 14 wherein a second application of resin of higher viscosity than the resin in the crack not under pressure is performed overlying the previously applied resin prior to covering with a retaining means.

16. The method of claim 13 wherein the pressure applied on the reverse side of the windshield is applied in a localized area commencing near the point of application of said higher viscosity resin and said area of application of pressure is generally progressively moved with said progressive application of said higher viscosity resin.

17. The method of claim 11 further comprising applying pressure on the reverse side of the windshield along the crack to open the crack in at least a portion thereof to facilitate entry of said higher viscosity resin therein and releasing said pressure after application of said higher viscosity resin in the crack.

18. The method of claim 17 wherein the pressure applied on the reverse side is applied in a localized area commencing near the point of application of said higher viscosity resin and said area of application of pressure is generally progressively moved with said progressive application of said higher viscosity resin.

19. The method of claim 17 wherein the exposed resin is covered with a retaining means prior to curing.

20. The method of claim 19 wherein a second application of resin of preselected viscosity of higher viscosity than the resin in the crack not under pressure is performed overlying the previously applied resin prior to covering with a retaining means.

21. The method of claim 10 wherein the first end of the crack terminates at a point and the second end of the crack terminates at the edge of the glass and either the first resin or the higher viscosity resin is first applied and is cured and the remaining one of the first or higher viscosity resin is thereafter applied and cured.

22. The method of claim 10 wherein the higher viscosity resin is applied first commencing from the edge.

23. The method of claim 22 further comprising applying pressure on the reverse side of the windshield along the crack to open the crack in at least a portion thereof to facilitate entry of said higher viscosity resin therein and releasing said pressure after application of said higher viscosity resin in the crack.

24. The method of claim 23 wherein the pressure applied on the reverse side is applied in a localized area commencing near the point of application of said higher viscosity resin and said area of application of pressure is generally progressively moved with said progressive application of said higher viscosity resin.

25. The method of claim 24 wherein the exposed resin is covered with a retaining means prior to curing.

26. The method of claim 25 wherein a second application of resin of higher viscosity than the resin in the crack not under pressure is performed overlying the previously applied resin prior to covering with a retaining means.

27. The method of claim 11 wherein said higher viscosity resin is progressively applied commencing from the edge of the glass progressively toward said point.

28. The method of claim 27 wherein after the higher viscosity resin is applied increased vacuum is applied at the opening.

29. The method of claim 10 wherein the first end of the crack terminates at a point and the second end of the crack terminates at the edge of the glass comprising;
first applying said higher viscosity resin progressively to said surfaced length of the crack from the edge toward the point and then applying said vacuum to aid in drawing said higher viscosity resin toward the point and then applying said first resin under pressure at the point.

30. The method of claim 29 further comprising applying pressure on the reverse side of the windshield along the crack to open the crack in at least a portion thereof to facilitate entry of said higher viscosity resin therein and releasing said pressure after application of said higher viscosity resin in the crack.

* * * * *

REEXAMINATION CERTIFICATE (2122nd)

United States Patent [19]
Campfield, Jr.

[11] B1 5,116,441
[45] Certificate Issued Nov. 2, 1993

[54] GLASS REPAIR KIT AND METHOD OF USE

[76] Inventor: Richard A. Campfield, Jr., 9249 Loquat Dr., Riverside, Calif. 92508

Reexamination Request:
No. 90/002,958, Jan. 27, 1993

Reexamination Certificate for:
Patent No.: 5,116,441
Issued: May 26, 1992
Appl. No.: 580,075
Filed: Sep. 10, 1990

[51] Int. Cl.⁵ .................................... B32B 35/00
[52] U.S. Cl. .................................... 156/94; 425/12; 425/13; 264/36
[58] Field of Search ................ 156/94; 425/11, 12, 425/13; 264/36

[56] References Cited
U.S. PATENT DOCUMENTS
4,775,305 10/1988 Alexander et al. .................. 425/12

OTHER PUBLICATIONS

*News Breaks*, Glas-Weld Systems, Inc., Aug. 1984, pp. 1-2; Bend, Oregon.
*News Breaks*, Glas-Weld Systems, Inc., Jun. 1988; Bend, Oregon.
*News Breaks*, Glas-Weld Systems, Inc., Jul. 1988; Bend, Oregon.
*News Breaks*, Glas-Well Systems, Inc., Jul. 1989; Bend Oregon.
*News Breaks*, Glas-Weld Systems, Inc., Sep. 1989; Bend, Oregon.
Instruction Manual Glas Weld Systems, Inc. published at least as early as 1986, Bend, Oregon.
Instruction Manual Glas Weld Systems, Inc. published at least as early as 1988, Bend, Oregon.
Novus Inc., Instruction Manual, Preface, Table of Contents, Section II, pp. 1, 21, 22; 1980, Minneapolis, Minnesota.
Glas-Weld *News Breaks* Apr. 1985, p. 1; Bend, Oregon.
Glas-Weld *News Breaks* May, 1986, p. 2; Bend, Oregon.
Glas-Weld *News Breaks* Sep. 1988, p. 2, 4; Bend, Oregon.
Glas-Weld *News Breaks* Oct. 1988, p. 3; Bend, Oregon.
Glas-Weld *News Breaks* Mar. 1989, p. 2; Bend, Oregon.
Glas-Weld *News Breaks* Apr. 1989, p. 3; Bend, Oregon.
Glas-Weld *News Breaks* Aug. 1989, p. 1, 3; Bend, Oregon.

*Primary Examiner*—David A. Simmons

[57] ABSTRACT

A kit (150) of parts from which tools may be assembled for the repair of glass cracks by insertion of resin having an index of refraction substantially that of the glass. The tools are a repair bridge (160) and a repair bar (180) which may be placed on an automobile windshield and used to inject resin into a glass crack and a crack spreader (170) which may be placed on the inside of a windshield and used to spread the crack to facilitate entry of the resin. Methods of use of the tools are disclosed.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-30 is confirmed.

* * * * *